United States Patent [19]
Haeg et al.

[11] Patent Number: 5,744,708
[45] Date of Patent: Apr. 28, 1998

[54] WHEELPAN WITH DAMPING STRUCTURES

[75] Inventors: Steven R. Haeg, Shorewood; Thomas C. Owens, Chanhassen, both of Minn.

[73] Assignee: MTS Systems Corporation, Eden Prairie, Minn.

[21] Appl. No.: 698,364

[22] Filed: Aug. 15, 1996

[51] Int. Cl.$^6$ .................................................. E01C 23/00
[52] U.S. Cl. ........................................................... 73/146
[58] Field of Search ................................. 73/11.04, 146; 180/198

[56] References Cited

U.S. PATENT DOCUMENTS

| | | | |
|---|---|---|---|
| 3,001,394 | 9/1961 | Nelson | 73/146 |
| 3,520,180 | 7/1970 | Polhemus et al. | 73/146 |
| 3,871,210 | 3/1975 | Himmler et al. | 73/146 |
| 4,527,416 | 7/1985 | Haeg et al. | 73/11 |
| 4,798,088 | 1/1989 | Haeg et al. | 73/669 |
| 5,375,464 | 12/1994 | Daht | 73/146 |

OTHER PUBLICATIONS

Brochure: "Bringing The Test Track (And The Future) Into The Laboratory", MTS Systems Corporation, Eden Prairie, MN, pp. 1–27 (Feb. 1996).

"Testing Cars an Exact Science", *R & D Magazine*, pp. 22–24 (Mar. 1996).

Soundcoat Brochure: "Noise Control Materials for Industry", *Soundcoat*, Bulletin 800, Apr. 1996.

Soundcoat Product Data Sheet: "DYAD For use in thick plate vibration damping", *Soundcoat*, Bulletin 70, Rev. 1/92, Apr. 1996.

Soundcoat Brochure: "Material Engineered for Noise Control", *Soundcoat* Apr. 1996.

*Primary Examiner*—William L. Oen
*Attorney, Agent, or Firm*—Westman, Champlin & Kelly, P.A.; S. Koehler

[57] ABSTRACT

A wheelpan for use with tire coupled road simulators has a constrained layer damping material disposed between a top plate and a base plate, tuned mass dampers operably coupled to radially extending ribs or asymmetrical arrangement of the radially extending ribs in order to reduce vibrations of the wheelpan and noise generated therefrom.

12 Claims, 7 Drawing Sheets

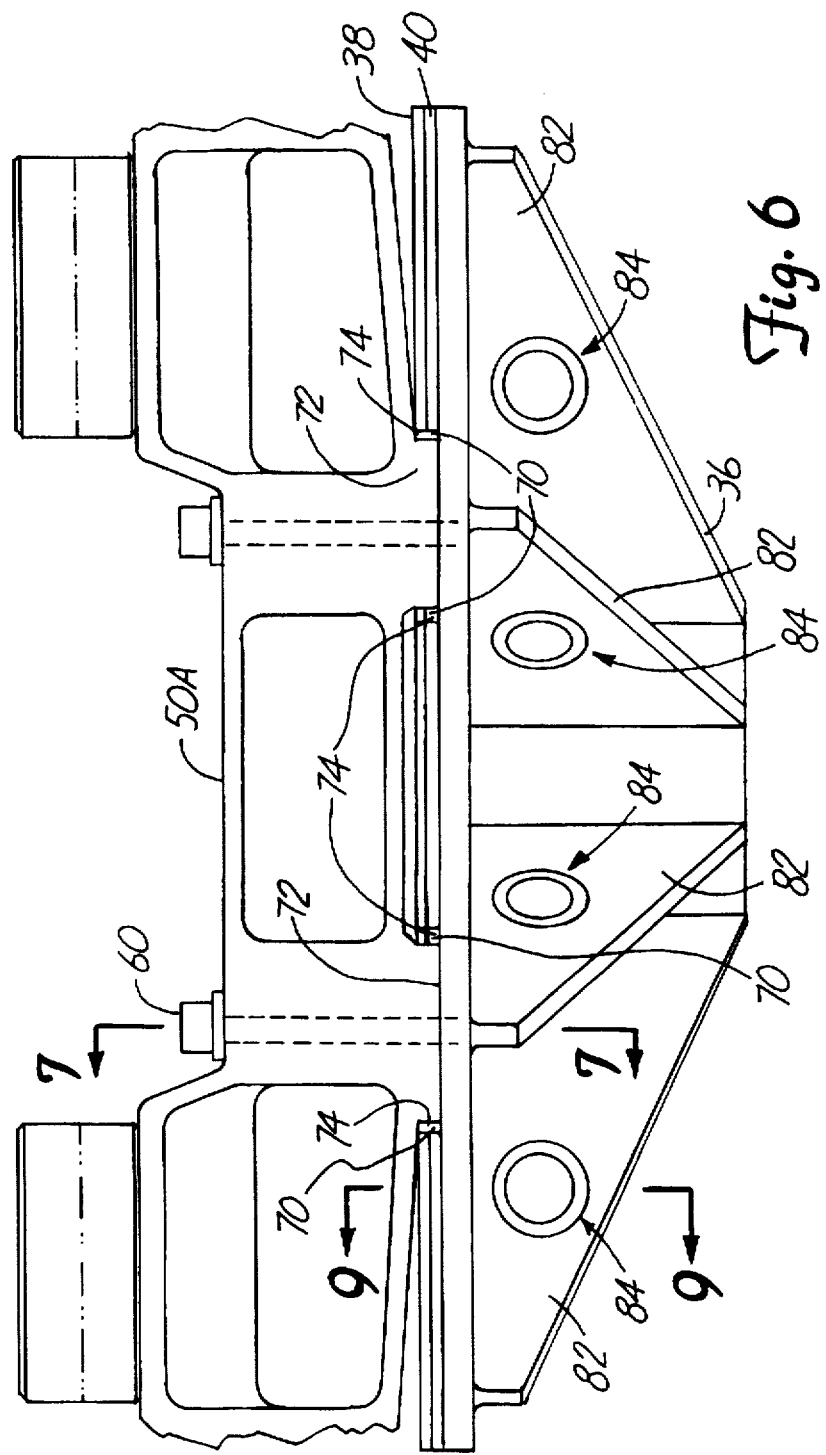

WHEELPAN WITH DAMPING STRUCTURES

BACKGROUND OF THE INVENTION

The present invention relates to vehicle testing systems. More particularly, the present invention relates to tire coupled road simulators having low audible noise wheelpans.

Tire coupled road simulators, often called "four-poster" systems, are now used with increasing frequency to test fully assembled vehicles, such as automobiles. The tire coupled road simulator includes a plurality of generally upright actuators supporting the vehicle. A wheelpan is mounted to an end of each rod of the actuators. Each wheelpan engages a tire of the vehicle at each corner of the vehicle. The actuators can be mounted below floor level in a test chamber so that the vehicle can be driven into the test chamber and onto the wheelpans. One particular test chamber is used to detect and track specific sounds and vibrations of a fully assembled vehicle. By applying forces through the tires, the wheelpans follow a path that is similar to the profile of a road. Simulation of the vehicle traveling down a road can be used to locate squeaks and rattles within the vehicle or measure the ability of the tire/suspension system to isolate road noise from the passenger compartment.

In view that the test chamber is used to measure noise made by the vehicle, any noise external to the vehicle that is transmitted into the test chamber pollutes noise measurements and complicates analysis. One particular source of external noise is from the wheelpans used to support and apply loads to the vehicle. Thus, there is an ongoing need to reduce noise generated and transmitted from the wheelpans.

SUMMARY OF THE INVENTION

The present invention is a wheelpan assembly that generates less vibrations, and thereby, reduces audible noise. A first aspect of the present invention is a wheelpan assembly having a base plate connectable to an actuator. The base plate has an upwardly facing surface. A top plate engageable with the vehicle has a downwardly facing surface facing the upwardly facing surface. A constrained material damping layer is disposed between the upwardly facing surface and the downwardly facing surface to dampen vibrations and allow limited movement of the top plate on the base plate.

A second aspect of the present invention is a wheelpan assembly having a plate and a stem connectable to an actuator. A plurality of radially extending ribs joins the stem to the plate. At least one tuned mass damper is operably coupled to one of the ribs in order to dampen vibrations generated therefrom.

A third aspect of the present invention is a wheelpan assembly having a plate and a stem joined to the plate and connectable to an actuator. A plurality of radially extending ribs are asymmetrically disposed about the stem to reduce certain modes of vibration. The ribs join the stem to the plate.

BRIEF DESCRIPTION OF THE DRAWINGS

FIG. 6 is a side elevational view of a modified form of the wheelpan.

DETAILED DESCRIPTION OF THE PREFERRED EMBODIMENTS

Figure 1:
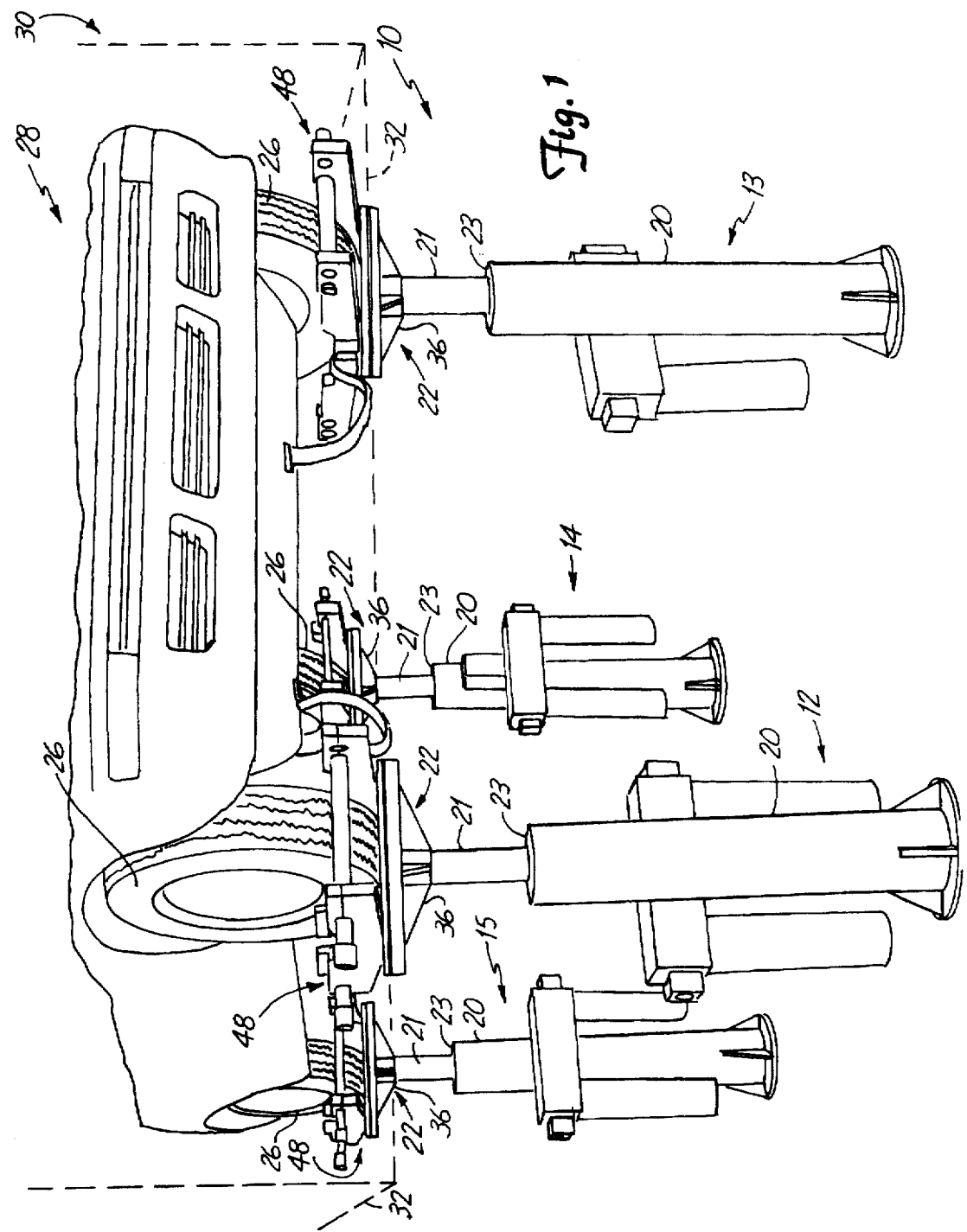
FIG. 1 is a perspective view of a tire coupled road simulator having wheelpans of the present invention.

A vehicle test system is shown generally in FIG. 1 at 10 and includes four individual actuator assemblies 12, 13, 14 and 15. The actuator assemblies 12–15 are servo-controlled hydraulic actuators having a cylinder portion 20 with an internal piston, not shown, which is subjected to differential pressures to move an actuator rod 21. The actuator rod 21 extends through a cap or end portion 23 of the cylinder portion 20 and is mounted for sliding movement along its longitudinal axis as the internal piston moves.

Figure 2:
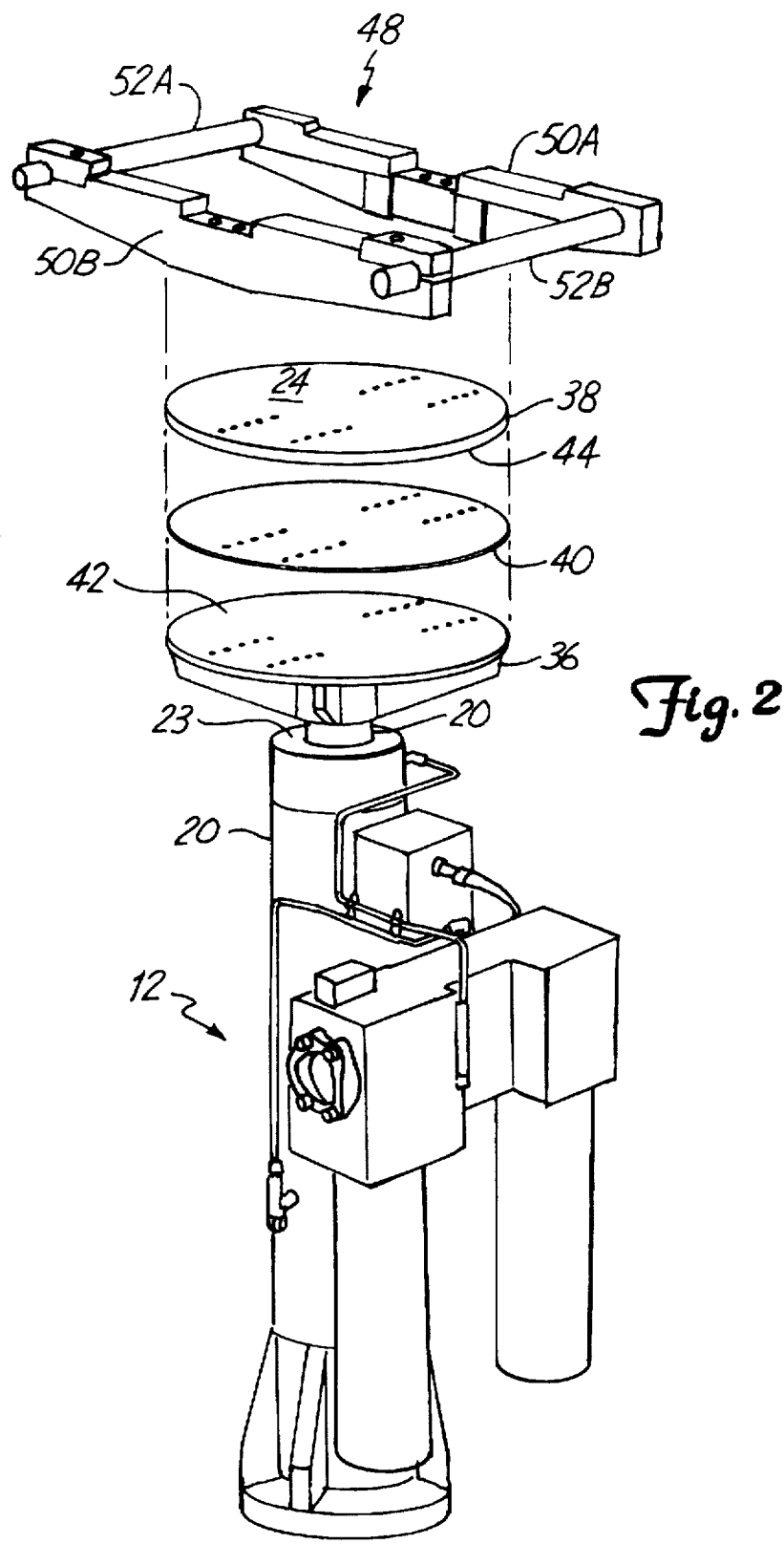
FIG. 2 is an exploded perspective view of the wheelpan and a perspective view of an actuator and a tire restraint fixture.

An embodiment of a wheelpan 22 of the present invention is mounted on an end of each actuator rod 21. Referring also to FIG. 2, each wheelpan 22 includes a flat or planar upper surface 24 that provides a support surface for a tire 26 of a vehicle 28 under test. The test system 10 is generally known in the art as a "four-poster" test system, which applies simulated road forces through the tires 26. The generally upright actuator assemblies 12–15 cycle the wheelpans 22 up and down, being controlled as to displacement and velocity, in order to apply test loads to the vehicle 28. The test system 10 can be used for noise analysis, wherein the vehicle 28 is typically mounted in a sound isolated (semi-anechoic) chamber, illustrated generally with dashed lines at 30, to aid in detecting and tracking specific sounds and vibrations. The actuator assemblies 12–15 are typically mounted below a chamber floor 32 wherein the wheelpans 22 project into the chamber 30.

Figure 3:
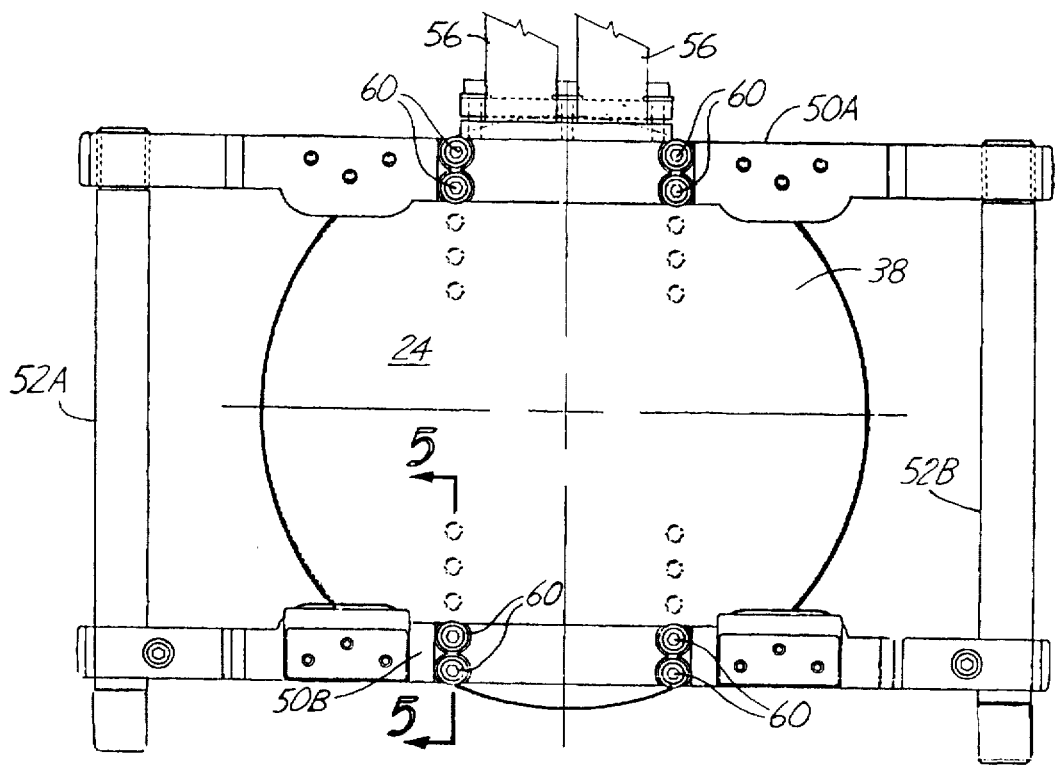
FIG. 3 is a top plan view of the wheelpan and the tire restraint fixture.
Figure 4:
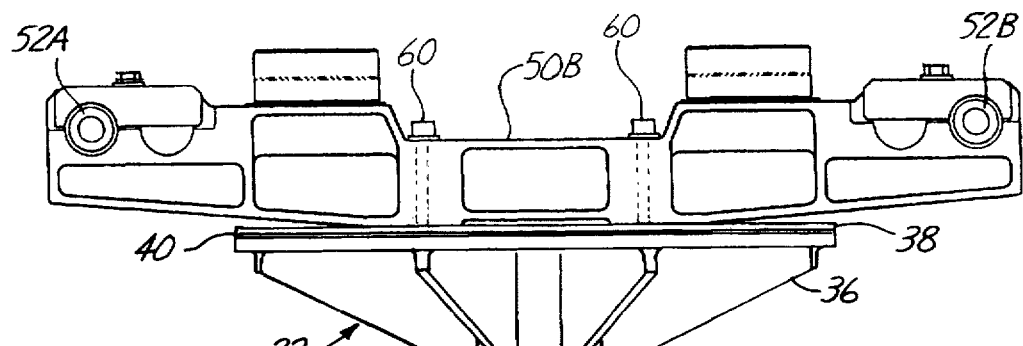
FIG. 4 is a side elevational view of the wheelpan and the tire restraint fixture.

The wheelpan 22 reduces audible noise generated and transmitted into the test chamber 30. Referring to FIGS. 2, 3 and 4, each wheelpan 22 includes a base plate 36 connected to the actuator rod 21, a top plate 38 having the upper surface 24 engaging the tire 26 of the vehicle 28, and a constrained layer damping material 40 disposed between an upwardly facing surface 42 of the base plate 36 and a downwardly facing surface 44 of the top plate 38. Preferably, the constrained layer damping material 40 comprises a visco-elastic material bonded with an adhesive in a suitable manner to the upwardly facing surface 42 of the base plate 36 and the downwardly facing surface 44 of the top plate 38. Visco-elastic materials are commercially available, for example, from Soundcoat Co., Inc. of Deer Park, N.Y. as DYAD, with various stiffness and damping ratios. It has been found that for wheelpans 22 having a 17 inch diameter upper surface 24 with the base plate 36 and the top plate 38 formed from cast aluminum, and wherein the top plate 38 is 0.125 inches thick, a visco-elastic material 0.010 inches thick was sufficient to substantially reduce the audible noise generated by the wheelpan 22.

Tire restraint fixtures 48 are typically used to maintain each tire 26 in a fixed stationary position on the wheelpans 22. Each tire restraint fixture 48 includes spaced-apart lateral side rails 50A and 50B that are individually secured to the wheelpans 22. End bars 52A and 52B extend between the lateral side rails 50A and 50B to form a generally rectangular structure to surround and engage a lower portion of each tire 26. Straps 56 joined to the lateral side rail 50A are typically secured to another portion of the vehicle 28 adjacent the corresponding wheelpan 22 such as an axle, not shown. The tire restraint fixtures 48 are available from MTS Systems Corporation of Eden Prairie, Minn.

Figure 5:
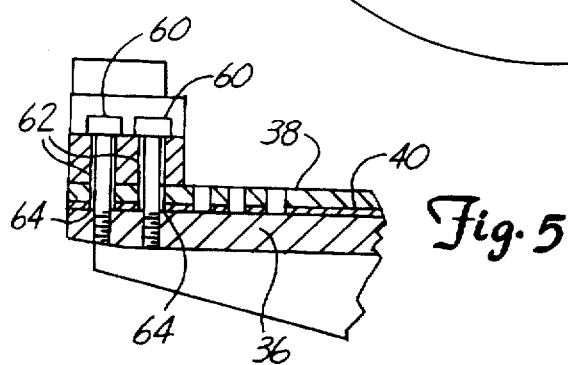
FIG. 5 is a sectional view taken along lines 5—5 in FIG. 3.

In the embodiment illustrated, the lateral side rails 50A and 50B of each tire restraint fixture 48 are fastened directly to each of the corresponding base plates 36. Referring also to FIG. 5, bolts 60 extend through apertures 62 provided in the top plate 38 and through apertures 64 provided in the constrained layer damping material 40. The apertures 62 of the top plate 38 are of suitable size to provide necessary clearance between the top plate 38 and the bolts 60 to allow small movements of the top plate 38 relative to the bolts 60 in order to provide necessary damping. In spite of a rigid connection between the base plate 36 and the lateral side rails 50A and 50B formed by the bolts 60, and the clamping forces generated between the top plate 38 and the lateral side rails 50A and 50B necessary to secure the lateral side rails 50A and 50B to the wheelpan 22, extrusion of the visco-elastic material 40 is minimized and audible noise of the wheelpan 22 is significantly reduced from solid wheelpans of the prior art having no constrained layer damping material 40.

Figure 7:
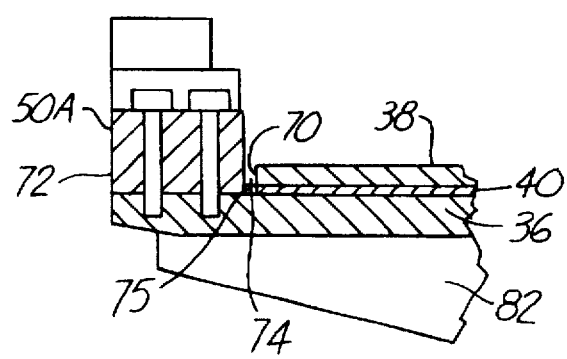
FIG. 7 is a sectional view taken along lines 7—7 in FIG. 6.

In a modified form of the present invention illustrated in FIGS. 6 and 7, suitable notches 70 are provided in the top plate 38 to receive a lower portion 72 of each of the lateral side rails 50A and 50B. The notches 70 are of suitable size to provide a necessary clearance gap 74 between the top plate 38 and the adjacent lateral side rails 50A and 50B. In this embodiment, the lateral side rails 50A and 50B are mounted directly to the base plate 36 with the top plate 38 free to move. As illustrated, the constrained layer damping material 40 can also include notches 75 to receive the lower portions 72 of the side rails 50A and 50B.

Figure 8B:
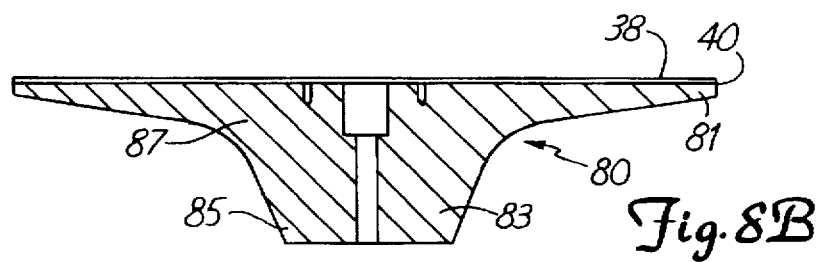
FIG. 8B is a sectional view of the base plate with a top plate and a constrained layer damping material.
Figure 8A:
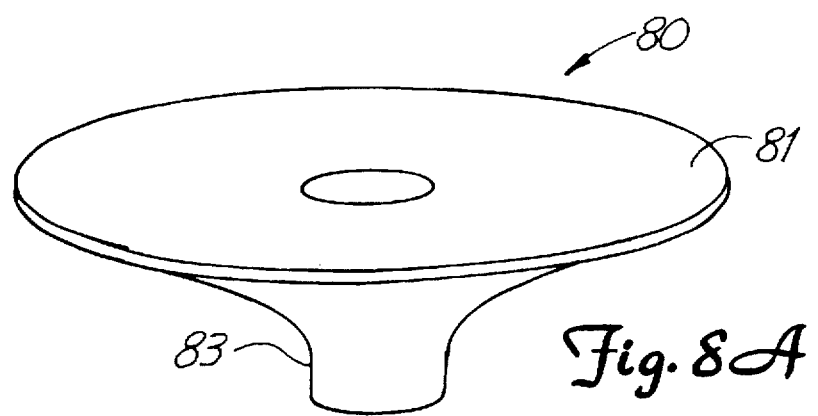
FIG. 8A is a alternative embodiment of a base plate.

An alternative base plate 80 is illustrated in FIGS. 8A and 8B. The base plate 80 is formed without radially extending ribs 82 as a single unitary piece in order to further minimize audible noise. The base plate 80 includes a plate portion 81, preferably, integrally formed with a stem portion 83. In FIG. 8B, the base plate 80 is shown with the constrained layer damping material 40 and the plate 38. The stem portion 83 includes a first portion 85 connectable to the actuator rod 21 and a second portion 87 joined to the plate portion 81. The second portion 87 has a width larger than the first portion 85. It has been found that the radially extending ribs 82 also contribute to the audible noise generated by the wheelpans 22.

Figure 9:
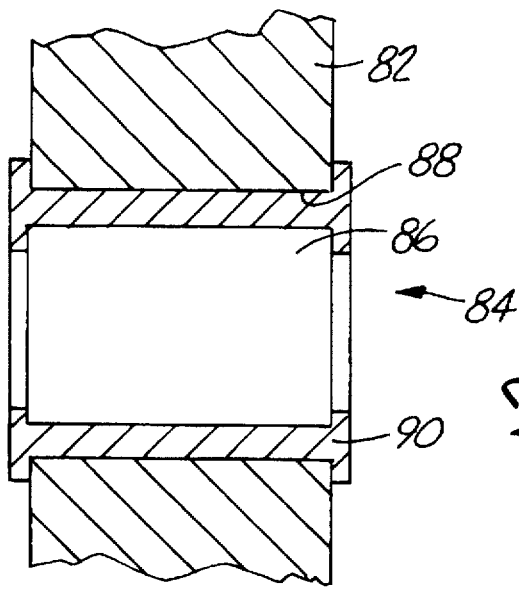
FIG. 9 is a sectional view of a tuned mass damper taken along lines 9—9 in FIG. 6.
Figure 10:
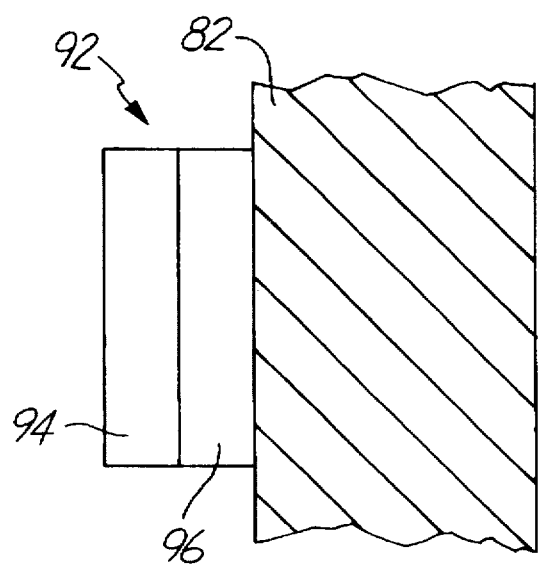
FIG. 10 is a side elevational view of an alternative embodiment of a tuned mass damper attached to a rib illustrated in section.

Another aspect of the present invention is illustrated in FIGS. 6, 9 and 10. In order to dampen vibrations present in the ribs 82, a tuned mass damper 84 is coupled, preferably, to each of the ribs 82. In FIGS. 6 and 9, the tuned mass damper 84 includes a mass element 86 such as a rod supported in an aperture 88 of the rib 82 by a spring element 90 such as a rubber bushing herein illustrated. The mass of the mass element 86 and the spring constant of the spring element 90 are selected in order to dampen vibrations from the rib 82.

An alternative embodiment of a tuned mass damper is illustrated in FIG. 10 at 92. In this embodiment, a mass element 94 is secured to a spring element 96 comprising, for example, a block of rubber that, in turn, is secured to an outer surface of the rib 82.

Figure 11:
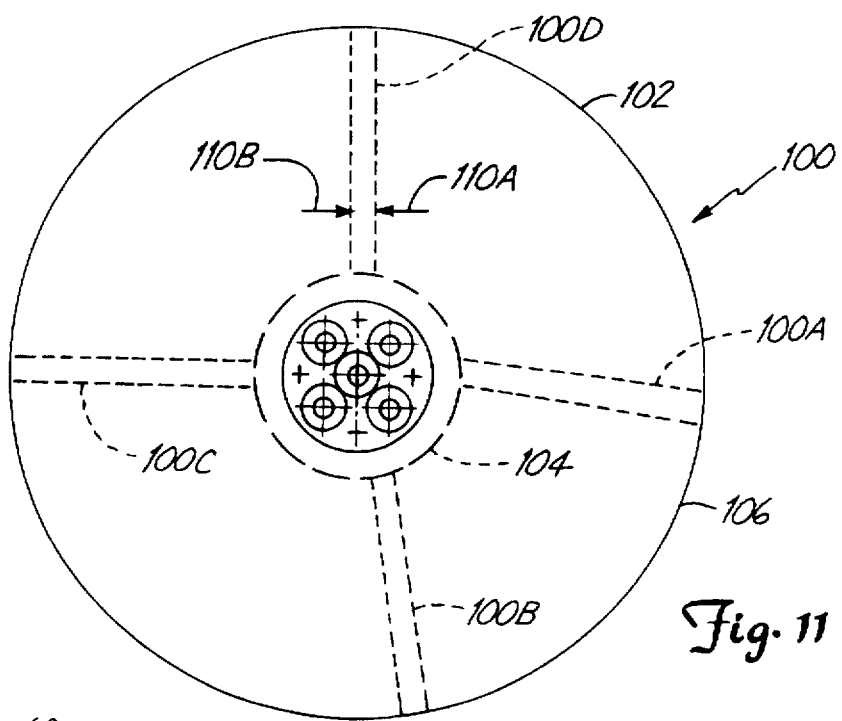
FIG. 11 is a top plan view of a baseplate illustrating another aspect of the present invention.

Another aspect of the present invention is illustrated in FIG. 11. This aspect includes asymmetrical arrangement of ribs 100 on a base plate 102. Like the ribs 82 of the base plate 36, ribs 100A, 100B, 100C and 100D extend radially between a stem portion 104 and a plate portion 106 of the base plate 102. In the embodiment illustrated, asymmetrical arrangement of the ribs is achieved by disposing the ribs 100A-100D at unequal angular intervals about the stem portion 104. If desired, a width, indicated by opposed arrows 110A and 110B, of the ribs 100A-100D can also be varied. It should be understood that any suitable number of radially extending ribs can be connected between the stem portion 104 and the plate portion 106 as well as interconnecting ribs extending between the radially extending ribs 100A-100D can also be used.

The tuned mass dampers 82 and 92 of FIGS. 6, 9 and 10, and the asymmetrical arrangement of the ribs 100 used to connect the stem portion 104 to the plate portion 106 can be used alone or in combination with the constrained layer damping material 40 and top plate 38, described above. The tuned mass dampers 82 and 92 and the asymmetrical arrangement of the radially extending ribs 100 is particularly useful in large wheelpans where a solid base plate 80 such as illustrated in FIG. 8 cannot be used because the moving mass of the solid base plate 80 would be too large.

Although the present invention has been described with reference to preferred embodiments, workers skilled in the art will recognize that changes may be made in form and detail without departing from the spirit and scope of the invention.

What is claimed is:

1. A wheelpan assembly for supporting a vehicle on a vehicle test system, the wheelpan assembly comprising:
   a base plate connectable to an actuator, the base plate having an upwardly facing surface;
   a top plate engageable with the vehicle, the top plate having a downwardly facing surface facing the upwardly facing surface of the base plate; and
   a visco-elastic damping layer disposed between the upwardly facing surface of the base plate and the downwardly facing surface of the top plate.

2. The wheelpan assembly of claim 1 and a tire restraint fixture coupled to the base plate.

3. The wheelpan assembly of claim 2 wherein the tire restraint fixture includes a fastener and the top plate includes an aperture through which the fastener extends, the aperture being of size to provide a clearance gap between the fastener and the top plate.

4. The wheelpan assembly of claim 3 wherein the visco-elastic damping layer includes an aperture through which the fastener extends.

5. The wheelpan assembly of claim 4 wherein the tire restraint fixture includes a member engageable with a tire of the vehicle, the fastener securing the member to the base plate; and wherein the aperture is of size to receive a portion of the member and provide a clearance gap between the portion of the member and the top plate.

6. The wheelpan assembly of claim 1 wherein the base plate includes a stem connectable to the actuator, a plate portion having the upwardly facing surface of the base plate, and radially extending ribs securing the stem to the plate portion.

7. The wheelpan assembly of claim 1 wherein base plate includes a plate portion having the upwardly facing surface of the base plate and a stem having a first portion connectable to the actuator and a second portion joined to the plate portion, the second portion having a width larger than the first portion.

8. The wheelpan assembly of claim 7 wherein the stem is integrally joined to the plate portion.

9. A wheelpan assembly for supporting a vehicle on a vehicle test system, the wheelpan assembly comprising:

a plate;

a stem connectable to an actuator;

a plurality of radially extending ribs joined to the stem to the plate; and a tuned mass damper operably coupled to one of the ribs.

10. The wheelpan assembly of claim 9 wherein the tuned mass damper includes a mass element extending through said one of the ribs.

11. The wheelpan assembly of claim 10 wherein the said one of the ribs includes an aperture, and wherein the tuned mass damper includes a rubber bushing disposed in the aperture, the mass element being disposed in the rubber bushing.

12. A wheelpan assembly for supporting a vehicle on a vehicle test system, the wheelpan assembly comprising:

a plate;

a stem joined to the plate and connectable to an actuator; and a plurality of radially extending ribs asymmetrically disposed about the stem, the ribs joining the stem and the plate.

* * * * *